United States Patent [19]

Arnesen

[11] Patent Number: 4,822,473
[45] Date of Patent: Apr. 18, 1989

[54] ELECTRODE FOR GENERATING AN ELECTROSTATIC FIELD

[76] Inventor: Tore C. Arnesen, 158 Rexway Dr., Georgetown, Ontario, Canada, L7G 1S1

[21] Appl. No.: 189,111

[22] Filed: May 2, 1988

Related U.S. Application Data

[63] Continuation of Ser. No. 905,466, Sep. 10, 1986, abandoned.

[51] Int. Cl.⁴ .............................................. C25B 11/00
[52] U.S. Cl. .................. 204/302; 204/290 R
[58] Field of Search .......... 204/280, 286, 288, 290 R, 204/302, 304, 305, 306, 307, 308; 210/748, 243

[56] References Cited

U.S. PATENT DOCUMENTS

| | | | |
|---|---|---|---|
| 2,908,623 | 10/1959 | Doring, Jr. | 204/196 |
| 3,357,910 | 12/1967 | Shiller | 204/195 |
| 3,585,122 | 6/1971 | King | 204/302 |
| 3,772,178 | 11/1973 | Wilson | 204/280 X |
| 3,941,676 | 3/1976 | Macken | 204/266 |
| 4,024,047 | 5/1977 | Clark et al. | 204/302 |
| 4,073,712 | 2/1978 | Means | 204/186 |
| 4,199,429 | 4/1980 | McMahon | 204/302 |
| 4,436,604 | 3/1984 | Walters | 204/196 |
| 4,545,887 | 10/1985 | Arnesen et al. | 204/280 |

Primary Examiner—John F. Niebling
Assistant Examiner—William T. Leader
Attorney, Agent, or Firm—Donald E. Hewson

[57] ABSTRACT

An electrostatic field generator for applying an electrostatic field by submersion in a liquid has a cantilever tubular construction wherein an electrically conductive tube has a fluid impervious dieletric sleeve covering a major portion of the outer surface of the tube and at least one insulative end cap secured to an end of the tube in electrical isolating relation with the exterior of the tube. The end cap has attachment means for securing the end cap in aligned sealing relation with a through passage in the wall of a vessel and electrical circuit connect means in insulated relation within the end cap connected electrically to the conductive tube.

4 Claims, 1 Drawing Sheet

ELECTRODE FOR GENERATING AN ELECTROSTATIC FIELD

BACKGROUND OF THE INVENTION

This invention is directed to an improved electrostatic field generator, which has particular utility in liquid treatment systems.

The treatment of liquid systems with chemicals in order to avoid certain types of fouling and system degeneration is being superceded in certain instances by electrostatic protective systems, wherein an electrostatic field is imposed upon the system or portions thereof. It appears that such fields may inhibit nucleation with consequent stabilization of certain substances present in the liquid, providing an unexpected degree of stability thereto. In water storage systems, for instance, this can retard or prevent the formation of scale; as well as inhibiting (or indeed, reducing) algae or bacteria growth or presence in the liquid.

PRIOR ART

Early work in the use of electrostatic fields include arrangements such as that illustrated in U.S. Pat. No. 3,585,122, issued June 15, 1971, KING, wherein an insulated electrode is mounted within an adjacent grounded jacket, the system applying a high voltage to the electrode, and causing the flow of liquid under treatment, between the jacket and the electrode.

This type of system was superceded by the type of arrangement shown in U.S. Pat. No. 4,545,887, issued Oct. 8, 1985, ARNESEN et al, wherein an electrostatic field generator is supported in cantilevered relation as a probe within a tank enclosure, having a suitable voltage applied to the probe.

BRIEF DESCRIPTION OF THE INVENTION

The present invention comprises an improvement on the earlier ARNESEN et al electrostatic field generator, wherein the end structure fittings are simplified, and the weight of the end fittings is reduced, with consequence enhancement in system vibrational dynamics and associated stress levels. The electrical insulative characteristics of the system are appropriately enhanced, with consequent improvement in safety standards.

The invention thus provides an electrostatic system used in conjunction with any vessel such as a tank, pipe, etc.—or in any event, with a liquid system having a discernible flow or circulation—wherein a cantilevered field generator is located within the vessel. An electrically conductive tube extends within the vessel and has a fluid impervious dieletric covering in electrical insulating relation over a major portion of the outer surface of the tube. At least one insulative end cap is secured to one end of the tube in electrical isolating relation with the exterior of the tube, the end cap having attachment means for securing the end cap in aligned sealing relation with a through passage in the wall of the vessel; and electrical circuit contact means in insulated relation within the end cap, being connected electrically to the conductive tube.

In one embodiment, an aluminum tube serves as the electrical conductive portion of the field generator, and has end portions thereof sized to a predetermined diameter. A polytetrafluoroethylene (PTFE) layer, preferably TEFLON ®, is applied in sealing adherent relation as a dieletric and protective layer over the outer surface of the tube, to an extent which is adjacent the ends thereof; and a pair of end caps is secured in sealing relation over the ends of the tube, in overlying relation with the PTFE layer to isolate the interior of the tube from the ingress of liquid within the tube. One end cap has a threaded outer portion for attachment of the field generator, by insertion through a threaded passage in the wall of the vessel.

A preferred embodiment utilizes PTFE for the end caps. In one such cap embodiment, one or more rubber 0-rings are recessed into the wall of the bore into which the sized end portions of the aluminum tube are inserted, to make sealing contact with the PTFE layer enclosing the tube.

In one embodiment, a central rod construction interconnects two tube end caps of insulating material in load transfer relation therebetween, having a conical spring washer mounted on the rod to provide electrical contact with the inner surface of the conductive tube. One such embodiment provides encapsulation of the outer, accessible end of the central rod within a recess of the PTFE end cap, the rod being provided with a threaded recess at the end thereof to receive the securing screw of a high tension (voltage) lead in connecting relation therein. The recess in the end cap receives the insulated cover of the high voltage lead therein, to promote electrical safety.

BRIEF DESCRIPTION OF THE DRAWINGS

Certain embodiments of the invention are described, with particular relation to the prior art, reference being made to the accompanying drawings, wherein.

DETAILED DESCRIPTION OF THE INVENTION

Figure 1:
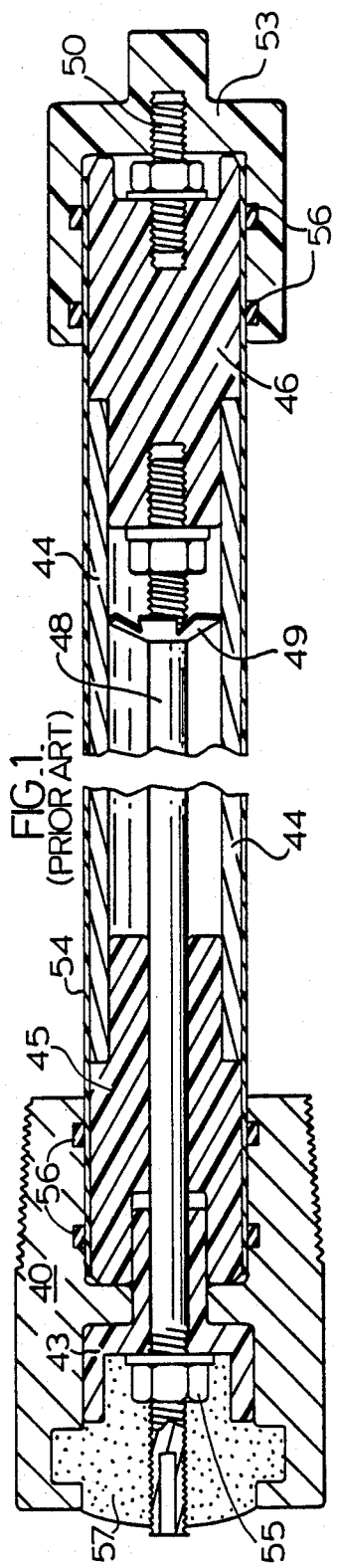
FIG. 1 is a diametrical section of a prior art field generator.

Referring first to FIG. 1, this prior art arrangement provides an aluminum tube 44 having a PTFE sleeve 54 in heat shrunk relation thereover.

A pair of plastic end caps 45, 46 are interconnected by way of rod 48 which carries a dished spring washer 49 in electrical contacting relation with the interior of tube 44. The outer end of rod 48 is secured by nut 55 within an insulaing sleeve 43. The rod 48 has an electrical terminal recess therein, the rod end being "potted" with potting material 57 within the brass fitting 40. O-rings 56 are placed between each of fitting 40 and end boss 53 and the tube. End boss 53 is clamped to end cap 46 by means of stud 50. It will be seen that a considerable number of insulating connector members are required in this prior art construction.

Figure 2:
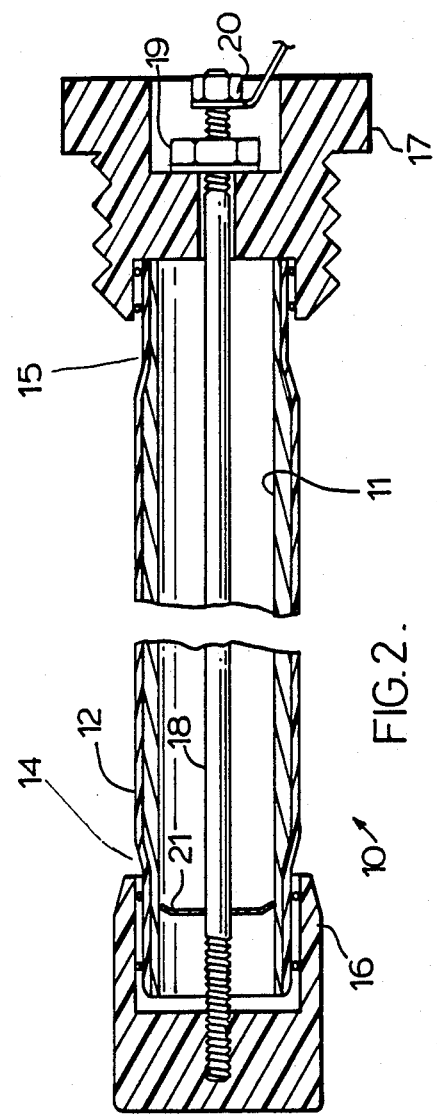
FIG. 2 shows in diametrical section the present invention, incorporating improved end caps at both ends of the field generator.

Turning to FIG. 2, the improved field generator 10 comprises a tube 11, generally of aluminum, having a dieletric cover 12 secured thereover, extending to adjacent the ends 14 and 15 of the tube 11, to provide electrical isolation of the surface thereof from the surrounding liquid, when in use. It has been found that a pair of heat shrinkable PTFE sleeves one on top of the other, each of 20 mil. thickness, provides a strong, tough, abrasion resistant cover, having suitable insulative and dieletric characteristics and liquid sealing capability.

The use of a double layer facilitates the application thereof and appears to ensure consistency of the insulation provided thereby, and overcomes defects such as pinholes that may be present in the PTFE sleeve material.

The ends 14 and 15 of tube 11 are specifically sized in diameter, each extending some two inches along the length of the tube 11.

An inner end insulating end cap 16 and outer end insulating end cap 17 cover the respective tube ends 14 and 15 in liquid sealing relation with the PTFE sleeve 12, so as to isolate the ends and the inner, unprotected surfaces of tube 11.

A conductive rod 18 is secured to the remote inner end cap 16. Rod 18 has a nut 19 within head end cap 17, bearing against a shoulder therein, to hold the end caps 16 and 17 in secured relation with the tube 11. The rod 18 may be of aluminum, steel, copper, brass, etc.

The outer end portion of rod 18 has a threaded recess to receive a high tension electrical lead 20 in secured relation thereto by way of an end screw. A hardened conical washer 21 mounted on rod 18 makes contact with the inner surface of tube 11, for the application of charging potential thereto, at a voltage typically of 6000 volts.

The end cap 17, referred to as the outboard or head cap, is threaded at the end thereof nearest tube 11, for removable securing insertion through the wall of a tank, heater pipe or other container of the system being serviced, so as to permit installation of the field generator 10. A protective and insulative end cap, incorporating protection for, and accomodating the HT lead 20 is secured to the cap 17.

Figure 3:
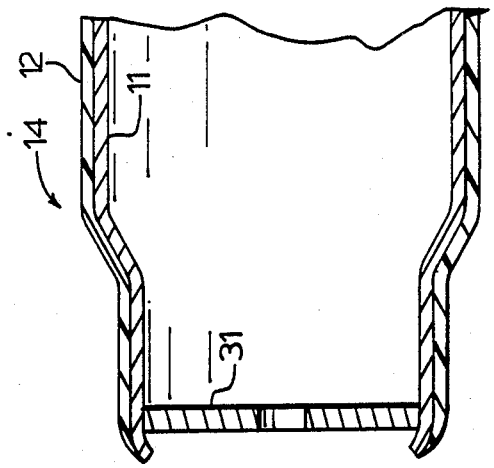
FIG. 3 shows in diametrical section the distal portion of the conductive tube of a further embodiment.

Turning to the FIG. 3 embodiment, the tube 11 is provided at the remote end with a rolled-in end plate 31, to provide support to the tube 11. The plate 31 is applied prior to the application of the dual layer sleeve 12.

What is claimed is:

1. An electrode adapted for use in generating a high voltage electrostatic field for use within a vessel containing a liquid medium to be acted thereupon, said electrode having an electrically conductive tube, and a liquid impervious dielectric sealing layer extending in protective, insulative, sealing relation over a major portion of the outer surface of said tube, the improvement comprising:

an electrically insulative end cap enclosing each end of said conductive tube and extending in sealing relation over said sealing layer, said end caps having unitary tension rod means extending in mechanically securing relation therebetween, one said end cap having attachment means for securing said end cap in aligned sealing relation within a through passage in a wall of said vessel to position said tube, in use, in immersed relation in said liquid within said vessel, and electrical connection means in said end cap connected in conducting relation with the interior of said tube, for the application of a high direct current voltage potential thereto.

2. The electrode as set forth in claim 1, wherein said tension rod includes a contact member engaging the interior of said tube in electrically conducting and mechanically secured relation therewith.

3. The electrode as set forth in claim 1, said conductive tube having a reinforcement disc secured therein adjacent an end of the tube to provide radial support to the tube.

4. The electrode as set forth in claim 1, said liquid impervious dielectric layer having a second such layer therebeneath, to substantially preclude the occurrence of pinhole penetration through said layers.

* * * * *